April 7, 1953 H. T. LAMBERT 2,633,943
SERVO-ACTING DISK BRAKE
Filed Jan. 12, 1950 4 Sheets-Sheet 1

INVENTOR.
H. T. Lambert
BY Robert Cobb
Attorneys.

April 7, 1953　　　　　H. T. LAMBERT　　　　　2,633,943
SERVO-ACTING DISK BRAKE

Filed Jan. 12, 1950　　　　　　　　　　　　　　4 Sheets-Sheet 2

INVENTOR.
H. T. Lambert
BY Robbert Cobb
Attorneys.

April 7, 1953 H. T. LAMBERT 2,633,943
SERVO-ACTING DISK BRAKE
Filed Jan. 12, 1950 4 Sheets-Sheet 3

INVENTOR.
H. T. Lambert
BY Robber Cobb
Attorneys.

April 7, 1953          H. T. LAMBERT          2,633,943

SERVO-ACTING DISK BRAKE

Filed Jan. 12, 1950          4 Sheets-Sheet 4

INVENTOR.
H. T. Lambert
BY Robert Cobb
Attorneys.

Patented Apr. 7, 1953

2,633,943

UNITED STATES PATENT OFFICE 2,633,943

SERVO-ACTING DISK BRAKE

Homer T. Lambert, St. Joseph, Mich., assignor to Lambert Brake Corporation, St. Joseph, Mich., a corporation of Michigan Application January 12, 1950, Serial No. 138,221

9 Claims. (Cl. 188—152)

My invention hereof has to do with improvements in the art of servo-acting disc brakes of the hydraulic class.

A primary novel feature of this invention lies in certain new provisions employed for facilitating the bleeding of trapped air from the fluid pressure lines of the brake mechanism, whereby a single bleed passage may be utilized to bleed the air from a plurality of piston chambers and connecting conduits which are pressurized in order to operate actuating discs to energize the same for effecting brake application.

Another feature of my invention involves novel construction of the hydraulic cylinder and piston units with the object of eliminating objectionable clicking and "klunking" noises that have been incident to operation of brakes of the type of my invention, as heretofore proposed in the art.

Still another object of my invention has been to provide novel mounting means for the brake discs employed in my brake unit, such as will reduce the frictional retarding of the movement of said discs when put into action under manual control to operate in a servo or self energizing manner, whereby to decrease the amount of pedal pressure required to effect a predetermined braking application, and also to accelerate the responsiveness of the brake units to manually initiated operation.

In the accompanying drawings:

Figure 1 is a sectional view on the line 1—1 of Figure 2, of a substantially complete brake assembly and associated wheel (broken away), some parts shown in elevation;

Figure 2 is a view partly in section and partly in elevation, and representing a section taken on the line 2—2 of Figure 1, showing a double-disc brake constructed in accordance with the present invention and as more particularly applicable to automotive vehicles, said brake embodying opposed sets of double-acting power cylinders or actuators, and one side of the rotatable brake housing or casing being removed so as to expose the interior of the brake assembly;

Like reference characters designate corresponding parts in the several figures of the drawings, from which it will be understood that although the brake construction is represented in a form which is more particularly applicable to automotive vehicles, it is not confined thereto.

Figure 1:
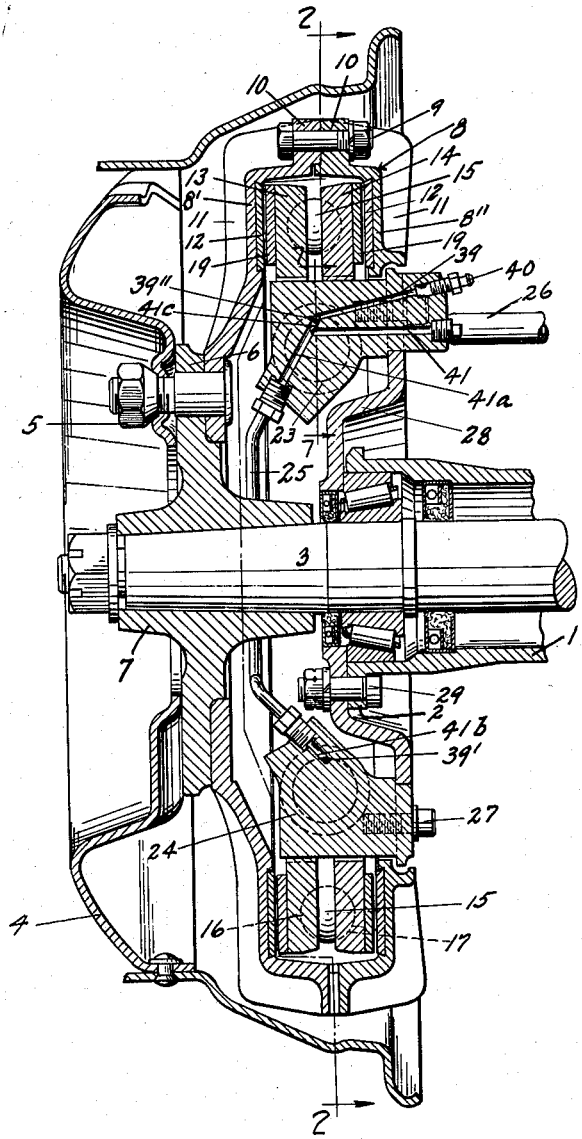
Figure 2:
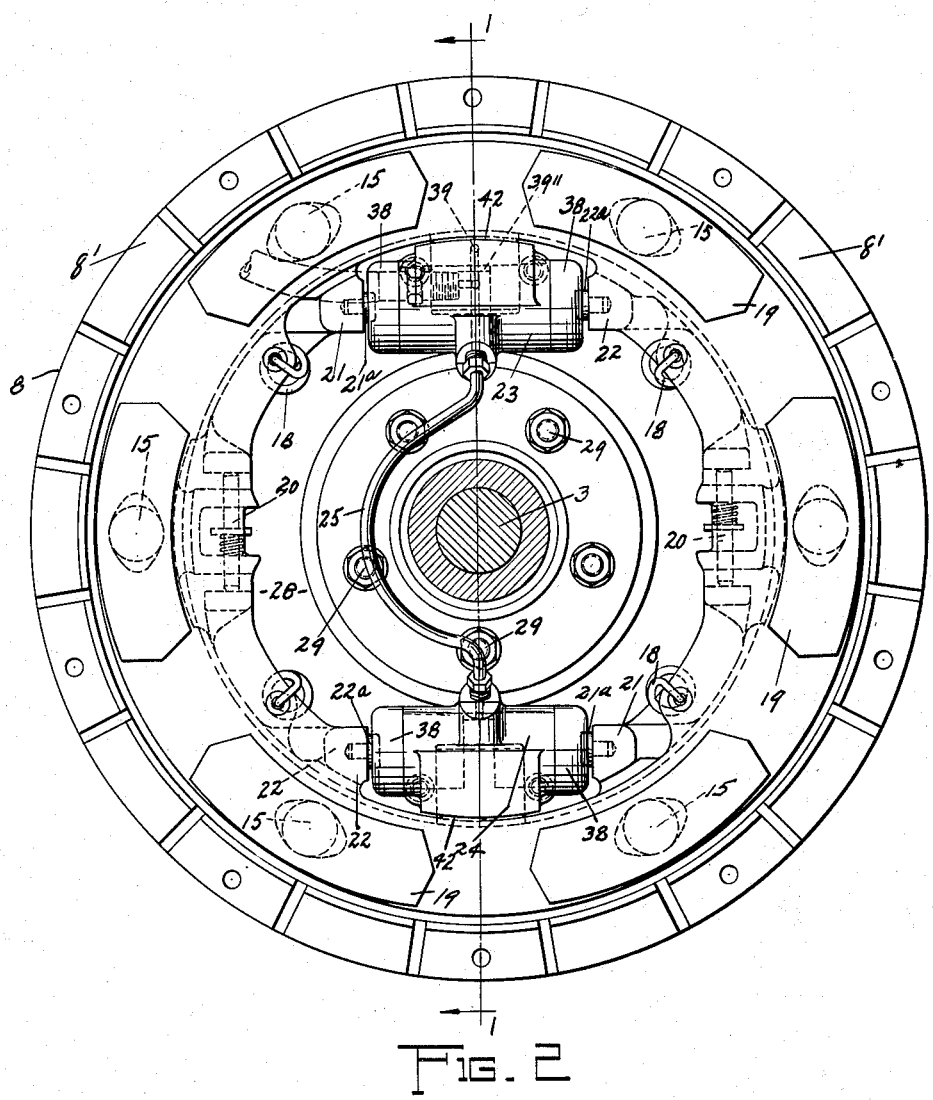
Figure 3:
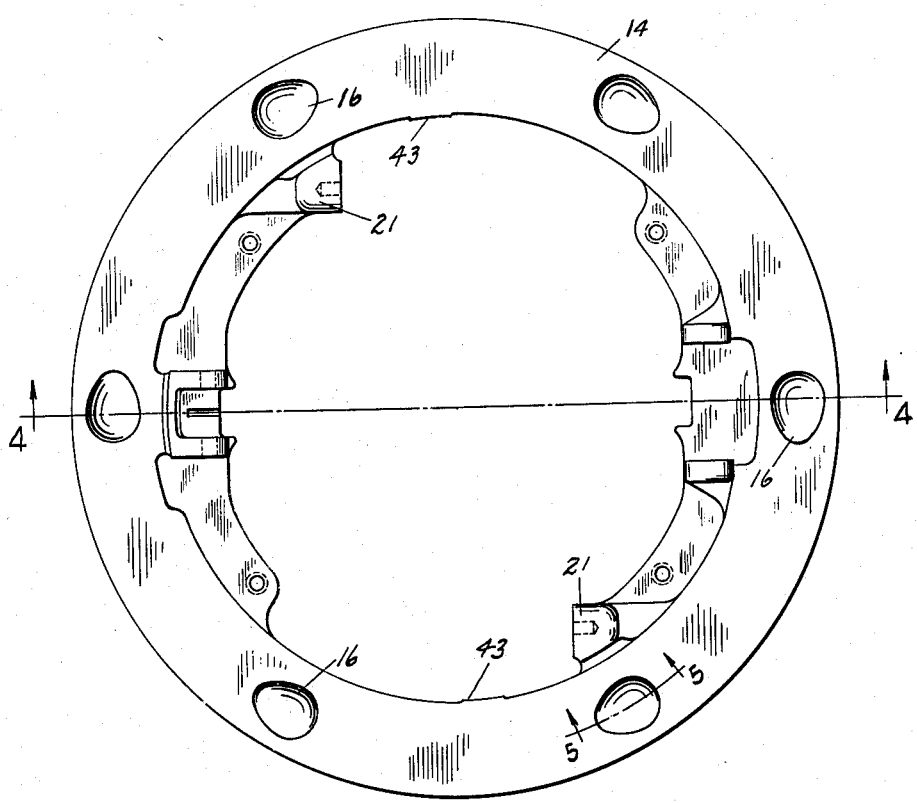
Figure 3 is a view in elevation, looking toward one side of one of the brake discs, both of which are of like construction.
Figure 4:
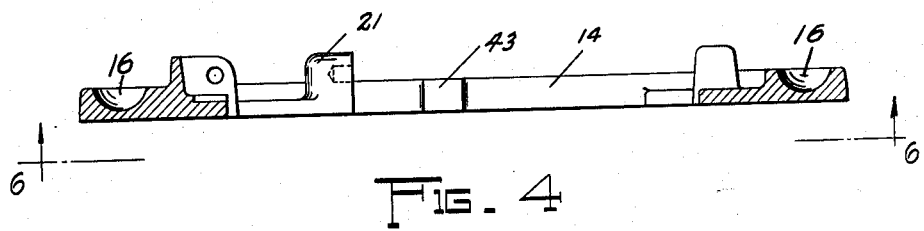
Figure 4 is a view in section, taken on the line 4—4 of Figure 3.
Figure 5:
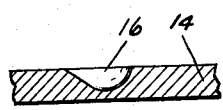
Figure 5 is a fragmentary section taken on the line 5—5 of Figure 3.

Referring first to Figures 1 to 3 of the drawings, 1 generally denotes a conventional wheel mounting of an automotive vehicle, said mounting being provided with an annular flange 2. At the outboard side of the mounting 1 and flange 2 is extended an axle 3 on which the wheel 4 is mounted, the wheel being suitably attached, as by bolts 5, to the radially extended flange 6 of a hub 7 as is conventional in certain makes of automotive vehicles.

Also attached to the flange 6 of the hub 7 is a brake housing or casing, generally indicated at 8, which constitutes the rotary member to be braked, said casing or housing being rotatable with the wheel 4. The casing or housing is preferably made in two parts, one of which is designated 8', and the other of which is designated 8", the two housing sections being suitably secured together as by means of a plurality of bolts or screws 9 extended through the abutting marginal flanges 10 at circumferentially spaced points about the housing. The outer faces of the housing sections 8', 8" are each provided with cooling fins or ribs 11, as is customary in such brake constructions, said fins or ribs aiding in dissipating the heat generated in the brake during braking action.

On the inner faces of the respective housing sections 8', 8", there are formed annular braking surfaces which are arranged in opposed, axially spaced relation to each other, said braking surfaces being preferably lined with suitable friction material as indicated at 12, 12.

Disposed within the housing or casing 8 is a double-disc assembly or unit which is composed essentially of two flat pressure plates or disc members respectively designated 13 and 14, the disc 13 being the outboard disc, and the disc 14 being the inboard disc. Arranged between the discs 13, 14 is a plurality of balls 15 seating in small sockets or seats 16 and 17 in the respective inner faces of the discs, the sockets or seats being oppositely inclined so as to provide camming ramps which act to force the discs 13 and 14 apart and into contact with the braking surfaces of the housing 8 responsive to slight relative rotation of the discs 13, 14. The discs are yieldingly connected together by a plurality of springs 18 which serve to normally yieldingly urge the discs towards each other, and at the same time normally urging the discs rotatively relative to each other so that the balls tend to assume a position in the deepest part of the respective seats 16, 17 which are opposed to each other in axially spaced relation.

The outer faces of the discs 13, 14 preferably have segments of friction lining material suitably secured thereto, as indicated at 19, said lining material being of appropriate thickness to allow a substantial range of wear during long use of the brake, without damaging the brake. These lining segments 19 are arranged in opposed relation to the linings 12 on the housing 8, so that when the discs 13, 14 are axially spread apart by the camming action of the balls 15, a powerful braking action is exerted upon the housing 8, with consequent braking of the wheel 4 which rotates with the housing. Motion of the vehicle accelerates the braking action after the initial braking engagement is made between the discs 13, 14 and the housing 8, this acceleration being customarily known as a servo-action.

In order to compensate for wear of the friction linings, and to maintain a constant running or release clearance between the friction surfaces of the brake, the discs 13, 14 may be provided with suitable automatic adjusters, as indicated in broken lines in Figure 2, and generally designated 20. The adjuster need not be further described herein since the same forms no part of the present invention.

In order to support the inner double-disc assembly concentrically within the brake housing 8, and to cause slight rotative movements of the discs 13, 14 relative to each other, as well as allow relative axial movements of the discs, each disc is provided with a pair of lugs or bosses arranged at diametrically opposite points and extended from the inner periphery of the discs, the lugs or bosses on the disc 14 being indicated at 21, 21, and those on the disc 13 being designated 22, 22. These lugs or bosses are so arranged and formed that when the discs 13, 14 are assembled together, with the balls 15 therebetween, one of the lugs 21 will be aligned with one of the lugs 22, but substantially spaced therefrom, at the upper side of the assembly, while the other lug 21 will be aligned with the other lug 22 and substantially spaced therefrom, at the lower side of the assembly, as more particularly shown in Figure 2 of the drawings. Between each pair of opposed lugs 21, 22 is mounted a wheel cylinder or fluid-operated actuator, the cylinder 23 generally indicating the upper cylinder or actuator, and the cylinder 24 generally indicating the lower cylinder or actuator. The two cylinders or actuators 23, 24 are connected together by a pipe or tube 25 to establish pressure fluid communication therebetween, and one of said cylinders, preferably the upper cylinder 23, is connected at the back thereof with the fluid line 26 of the usual hydraulic brake system of the vehicle, said system including the usual master cylinder (not shown) which is operated by a brake pedal in the conventional manner to apply and release the brakes.

Both cylinders or actuators 23, 24 are fixedly mounted in any suitable manner, as by bolting the same by bolts 27 to a stationary backing plate or adapter plate 28, which in turn is fixed in any suitable manner, as by means of bolts 29, to the wheel mounting flange 2 previously referred to.

The backing plate 28 lies at the inboard side of the brake assembly and extends into close proximity to the inner marginal edge of the inboard housing section 8'' so as to effectively close the housing 8 against the entrance of mud, water and other foreign matter which might otherwise splash in the brake during travel of the vehicle.

As will be best understood from reference to Figures 1 and 2, the two cylinders or actuators 23 and 24 are generally similar to each other, being straight end to end, and are preferably of the double-acting type. That is to say, each of the cylinders 23, 24 is provided with a transversely extended partition 30 located about midway of its length and defining at opposite sides thereof two piston chambers respectively designated 31, 32. Mounted slidably in each piston chamber 31 and 32 is a piston 33, preferably made of aluminum, each piston adapted to contact slightly at its inner end with the partition 30 and to be moved to slightly project at its outer end from the open end of its chamber. At its outer end each piston carries a detachable and replaceable wear pad 34 of button-like structure, having a rounded outer contact surface to cooperate with the corresponding surface of a wear pad or button member 21a on an adjacent lug 21, or wear pad member 22a of a like lug 22 as the case may be, of the respective lugs 21 and 22 carried by the discs 14, 13 of the inner disc assembly previously described. Thus in the case of the upper cylinder or actuator 23 in Figure 7, the wear pad 34 of the piston 33 at the left end of the cylinder 23 abuts the pad 21a of the lug 21 on the disc 14, while the pad 34 of the other piston abuts against the pad 22a of the lug 22 on the other disc 13. In the case of the lower cylinder 24, the pad 34 of the piston 33 in the left end of the cylinder abuts against the pad 22a of the lug 22 which is diametrically opposite the corresponding lug 22 coacting with the upper cylinder, while the pad 34 of the right hand piston 33 of cylinder 24 abuts against the pad 21a of the lug 21 on the disc 14 which is diametrically opposite the other lug 21 that coacts with the upper cylinder.

Disposed in the piston chambers 31, 32 behind the outermost transversely enlarged heads on the pistons 33 are rubber pressure sealing gaskets 35 abutting outwardly on the inner faces of the said enlarged heads, and engaged inwardly thereof by expander rings 36. Helical springs 37 are interposed between the cylinder partitions 30 and the expander rings 36 for the sealing gaskets 35 in the cylinders 23 and 24. The springs 37 are relatively light and offer only slight resistance to movement of the pistons 33 in their return movements toward the coacting partitions 30, but the pistons are cushioned substantially by slow movement and dash-pot effect of pressure fluid trapped in the cylinder chambers, as hereinafter more fully described.

At each of the outer ends of the cylinders 23 and 24 there is provided a sealing boot 38, preferably of a rubber diaphragm structure. Each boot has an outer skirt formed with an internal annular flange to interlock same with an annularly external grooved part 38a of the adjacent cylinder end. Also, each boot 38 has a central retreating nipple portion having an opening with a bead 38b at its edge interengaging the adjacent pad or wear button 34 of the near piston, inwardly of the shoulder provided by the enlarged rounded head of such member 34. The boot 38 is thus interlockingly sealed to the adjacent portion of the member 34 and adjacent end of the piston 33 at the central portion of said boot.

The construction of my cylinder and piston units or actuators as above described has been so improved in accordance with the features above set forth that the heretofore persisting "klunking" noises created during braking application of the discs 13 and 14, incident to opposite relative rotation of the discs responsive to actuation by the pressure fluid operated pistons 33 of cylinders 23 and 24, have been practically entirely eliminated. Especially is this true as regards such noises that have been audible during the alternate holding and releasing of the discs incident to reversal of the movement of the vehicle on which the brake means of the invention are mounted.

I have provided improved construction of the cylinder units or actuators 23 and 24, and associated fluid line connections for enabling the bleeding of air from all the cylinders at one time and through a single outlet means. This novel feature eliminates the necessity of releasing and retightening a bleeder screw for each cylinder, or separate piston chambers, as in prior brakes of the type of my invention, and thereby affords a saving of time as well as certain duplicate parts heretofore employed with obvious resultant advantages.

Figure 7:
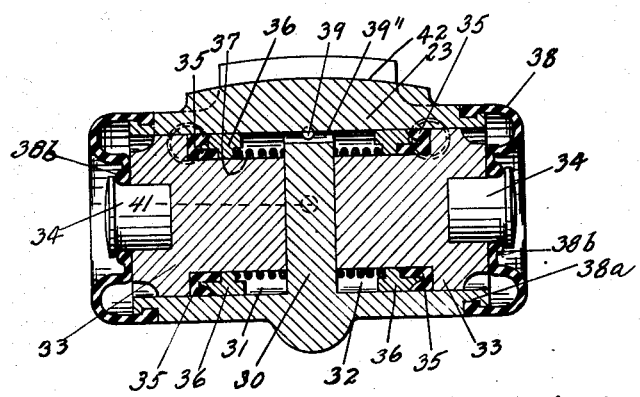
Figure 7 is a longitudinal sectional view of the upper cylinder and piston unit of Figures 1 and 2, taken on the line 7—7 of Figure 1.

The new bleeding construction is very simple and involves the provision, see Figures 1 and 7, of an axially disposed fluid passage 39' at the top of the partition 30 of the lower cylinder 24, establishing communication between the chambers 31 and 32 and a corresponding passage 39'' through the partition 30 of the upper cylinder 23. From the middle of the uper cylinder bleed passage 39'' there leads a single lateral outlet bleed passage 39 normally to be closed by the bleed valve or screw 40. Pressure fluid to operate the pistons 33 of all cylinders is supplied from the pressure fluid supply line 26 through a passage 41 leading into the partition 30 of the upper cylinder and connecting with a downwardly extending passage 41a in the said partition. The passage 41a connects with the coupled fluid line pipe or conduit 25 that connects at its lower end with the lower cylinder 24, by short passage 41b that intersects with the passage 39', extending axially of the lower cylinder partition 30 midway of its ends, see Figure 1.

The upper end of passage 41a in the upper cylinder partition 30 is extended up a short distance to connect with the bleed passage 39, as shown at 41c.

Thus the pressure fluid (oil) to actuate the pistons is admitted to the upper and lower cylinders 23 and 24, respectively, by entering passage 41, passing thence up short passage 41c to the partition axial passage 39'', to the two piston chambers 31 and 32 of the upper cylinder 23 and pistons therein which latter are thus adapted to be pressurized. Also the pressure fluid at the same time passes down the passage 41a through the pipe 25, through passage 41b, to axial passage 39' of the partition of 30 of the lower cylinder 24, thence to the piston chambers 31 and 32 of the latter cylinder to pressurize the pistons therein. It will thus be seen that the inlet passage 41 of cylinder 23 is indirectly connected to the four chambers 31 and 32 of the two cylinders 23 and 24 and enables the pressurizing of the four pistons therein simultaneously. Because of this construction, and the fact that the bleed passage 39 is connected to the fluid passages of all four piston chambers, any air trapped in the pressure lines may be evacuated or bled therefrom by opening the single bleed screw valve member 40 and using the customary bleeding practice.

When the brake is in a released condition, the fluid lines of the brake system, together with the wheel cylinders 23 and 24 are normally filled with fluid which is trapped in the lines and cylinders by the action of the master cylinder so as to maintain some residual pressure in the system, usually a few pounds, so that the pistons of both cylinders will normally be held in engagement with the wear pads of the lugs or bosses 21 and 22 on the respective discs 13 and 14 of the inner disc assembly. However, this pressure is insufficient to overcome the tension of the springs 18 which normally yieldingly urge the discs 13 and 14 towards each other and away from the friction surfaces of the rotary brake housing 8. However, on actuation of the master cylinder by operation of the usual brake pedal, the pressure fluid in the lines connected with the wheel cylinders, and in the cylinders themselves, is subjected to increased pressure which acts to force the pistons outwardly of the respective wheel cylinders, in opposite directions, thereby exerting a thrust upon the lugs 21 and 22 tending to shift the discs 13 and 14 rotatively relative to each other in opposite directions, thereby causing the camming balls 15 to climb the ramp portions of the respective recesses 16 and 17, with consequent spreading of the discs apart and into engagement with the rotary brake housing 8. This initial engagement would ordinarily tend to "clock" the inner disc assembly in the same direction as the direction of rotation of the brake housing, when the vehicle is in motion, so that it is necessary to hold one of the inner discs, preferably the inboard disc 14, relatively stationary, while leaving the other disc 13 free to rotate slightly relative to the inboard disc, so that on continuation of the pressure of the pressure fluid acting upon the wheel cylinders, together with the rotative drag or torque imparted by the housing to the outboard disc, the spreading action of the discs apart will continue to that extent sufficient to produce a powerful braking action upon the housing 8, and consequently upon the wheel 4.

According to the present invention, and assuming the brake housing 8 and the wheel 4 are rotating in a counter-clockwise direction, as viewed in Figure 2, the drag torque on initial engagement of the inner disc assembly with the housing will likewise be in a counter-clockwise direction, tending to "clock" the inner disc assembly counter-clockwise, thereby causing the lugs 22 on the outboard disc 13 to push against the pistons at the corresponding ends of both the upper and lower wheel cylinders 23, 24, inwardly until the inward movement of these pistons is stopped by the cushioning effect of the fluid and final contact of the pistons against the partitions in the cylinders, while at the same time the pressure fluid acts to force the pistons at the opposite ends of the respective wheel cylinders in an outward direction and against the lugs 21 until the disc 14 has rotated a sufficient amount relative to the disc 13, with consequent camming of the discs apart by the action of the balls 15, until the required braking engagement of both discs with the housing 8 is attained.

On reversal of the motion of the vehicle, with corresponding reversal of the direction of rotation of the wheel 4 and brake housing 8, the inner disc assembly will "clock" in the opposite direction, that is, in a clockwise direction as viewed in Figure 2, until the inboard disc 14 is stopped in a manner similar to that described above, and becomes the relatively stationary disc, while the outboard disc 13 is left free to rotatively shift in a clockwise direction until the discs spread apart sufficiently to fully engage the housing 8 with the required braking force.

According to the present invention, the wheel cylinders 23, 24 are utilized as the stop means for limiting the clocking action of the inner disc assembly and for holding one of the inner discs relatively stationary while the other inner disc is free to shift both rotatively and axially relative to the stationary disc during braking applications.

By reason of the curved or rounded outer surfaces of the wear pad members 34 and the like surfaces of the contacting wear parts 21a and 22a of the lugs 21 and 22 frictional contact between the pistons 33 and lugs on the respective discs 14, 13 during relative rotative and axial movements thereof is reduced to a minimum.

Figure 6:
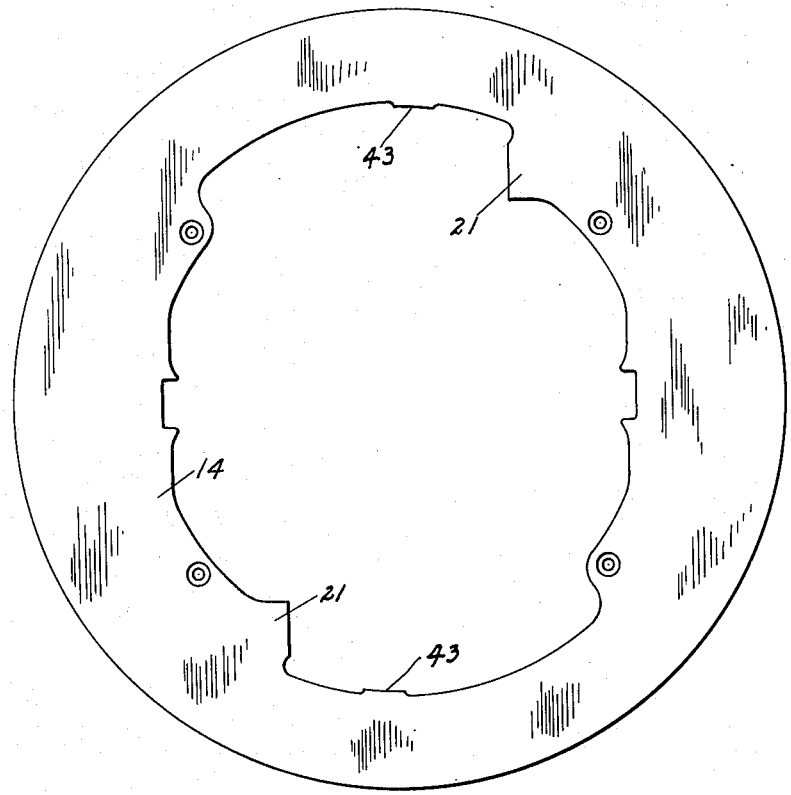
Figure 6 is an elevation of the disc of Figure 3 looking toward its opposite side, in the direction of arrow lines 6—6 of Figure 4.

On the radially outward sides of the cylinders 23 and 24 are integrally formed relatively long curved or arc shaped mounting or wear pads 42 which are in piloting contact with short wear pads 43 formed integrally on the inner peripheries of the discs 13, 14 (see Figures 3 to 7 inclusive). The pads 43 not only have short contact surfaces but they are located at diametrically opposite points on each side, and on opposite sides of a relatively vertical line vertically bisecting each disc, as seen in Figures 3 and 6. Thus the pads 43 of one disc engage opposite ends of the pads 42 of the opposing cylinders 23 and 24. The discs 13, 14, are alike and are constructed as seen in Figures 3 to 6, inclusive. I have found this described arrangement of the pads 42 and 43 advantageous because when the brakes are applied, the pads 43 will tend to move freely and away from the sloping side of the engaged pads 42, reducing retarding friction to a minimum. Prior constructions employed utilizing pads 43 as long as the pads 42 sometimes give rise in operation to an undesirable binding effect between the parts 42 and 43 interfering with complete freedom of brake application. It is of importance for the actuating discs in the present type of brake unit to be relieved of all retarding friction on both brake discs. The improvement just referred to has been found to give the brake unit more "life" (quickness of action) and to afford the advantage of decreased pedal pressure required to obtain a given degree of brake action. If the discs 13 and 14 are reversed, as respects their inboard and outboard positions relatively to the wheel, the pads 43 always assume their proper relation respecting the cylinder pads 42.

The small size of the passages 39' and 39" control a flow of the pressure fluid in the cylinder chambers 31, 32 such that a fluid cushioning action of dash-pot effect is actually present in the operation of the pistons under pressure released conditions.

Having thus described my invention, what I claim as new and desire to secure by Letters Patent of the United States, is:

1. A brake of the class described comprising a rotary housing adapted to be connected to a rotary member to be braked, an inner double-disc assembly concentrically disposed within said housing, with the discs free to move both rotatively and axially relative to each other, camming means between said discs of the inner disc assembly for spreading said discs axially apart into frictional engagement with the rotary housing responsive to relative rotative movements of said discs, and fluid-operated actuator means for imparting relative rotative movements to said discs, said actuator means including a pair of double-acting cylinders disposed in diametrically opposite relation to each other and each cylinder having opposed pistons axially movable therein responsive to fluid pressure, said pistons having actuating end portions, and said discs having lugs extending therefrom for actuating engagement by the said end portions of the pistons, pressure fluid supply means, fluid passages in the body of said actuator means and interconnected with an external passage leading from the pressure fluid supply means to all of the cylinders for pressurizing the pistons therein simultaneously, a single air bleed passage communicating with said fluid passages to bleed air trapped in any cylinder and the fluid passages, and a control closure for the bleed passage.

2. A brake as claimed in claim 1 in which the piston chambers of one double-acting cylinder are connected with those of the other cylinder by certain of the fluid passages, and in which the bleed passage directly communicates with the fluid passage between the chambers of the uppermost of the cylinders at its highest point.

3. A brake of the class described comprising a rotary housing adapted to be connected to a rotary member to be braked, an inner double-disc assembly concentrically disposed within said housing, with the discs free to move both rotatively and axially relative to each other, camming means between said discs of the inner disc assembly for spreading said discs axially apart into frictional engagement with the rotary housing responsive to relative rotative movements of said discs, and fluid-operated actuator means for imparting relative rotative movements to said discs, said actuator means including a pair of double-acting cylinders disposed in diametrically opposite relation to each other and each cylinder having opposed pistons axially movable therein responsive to fluid pressure, said pistons having rounded outermost end members, and said discs having lugs engaged by the piston end members, a first pressure fluid supply conduit connected to the uppermost one of said cylinders, passages in the body of said uppermost cylinder leading from said conduit to the piston chambers of said cylinder, a second fluid supply conduit connecting the said passages to the piston chambers of the second cylinder, so pressure fluid may be conducted to all of the piston chambers simultaneously, and an air bleed passage in the uppermost cylinder aforesaid common to all of the pressure fluid passages and conduits above mentioned.

4. A brake as claimed in claim 3, in which the bleed passage directly communicates with the passages at the uppermost point of said passages.

5. A brake of the class described comprising a rotary housing adapted to be connected to a rotary member to be braked, an inner double-disc assembly concentrically disposed within said housing, with the discs free to move both rotatively and axially relative to each other, camming means between said discs of the inner disc assembly for spreading said discs axially apart into frictional engagement with the rotary housing responsive to relative rotative movements of said discs, and fluid-operated actuator means for imparting relative rotative movements to said discs, said actuator means including a pair of double-acting cylinders disposed in diametrically opposite relation to each other and each cylinder having opposed pistons axially movable therein responsive to fluid pressure, said discs having lugs operably engaged by said pistons for actuation to impart relative rotation to the discs, and mounting means for supporting the discs for rotation and axial movement including relatively long wear pads on the radially outward portions of the opposing cylinders, and relatively short wear pads carried by the discs in engagement with the long wear pads of the cylinders.

6. A brake as claimed in claim 5, in which the short wear pads of the discs are disposed on opposite sides of a line centrally bisecting each disc intermediate the latter wear pads.

7. A brake as claimed in claim 6, in which the short wear pads of the discs are disposed on opposite sides of a line centrally bisecting each disc intermediate the latter wear pads, the cylinders benig disposed relatively one above the other, and the wear pads of the cylinders being correspondingly located and curved in opposite directions, said short wear pads of the discs being curved to conform with the curvature of the engaged cylinder wear pads.

8. A brake of the class described, comprising a rotary housing adapted to be connected to a rotary member to be braked, an inner double-disc assembly concentrically disposed within said housing with the discs free to move both rotatively and axially relative to each other, camming means between said discs of the inner disc assembly for spreading said discs axially apart into frictional engagement with the rotary housing responsive to relative rotative movements of said discs, and fluid-operated actuator means for imparting relative rotative movements to said discs, said actuator means including a pair of double-acting cylinders fixedly mounted in diametrically opposite relation to each other, and each cylinder having opposed pistons axially movable therein responsive to fluid pressure, said discs having lugs operatively engaged by said pistons for actuation thereby to impart relative rotation to the discs, means for maintaining said lugs in engagement with said pistons, and positioning means for centering the discs coaxially with respect to the central axis of the brake, said positioning means including relatively short pads on each disc projecting radially inwardly therefrom towards said cylinders, and said opposing cylinders each having their radially outward portions provided with a relatively long surface portion complemental to and cooperative with the relatively short pads aforesaid.

9. A brake as claimed in claim 8, in which the relatively short positioning pads on each disc are disposed on opposite sides of a line centrally bisecting the disc intermediate the relatively long surface portions of the cylinders.

HOMER T. LAMBERT.

REFERENCES CITED

The following references are of record in the file of this patent:

UNITED STATES PATENTS

| Number | Name | Date |
| --- | --- | --- |
| 1,786,856 | Madden | Dec. 30, 1930 |
| 1,913,932 | LaBrie | June 13, 1933 |
| 1,914,844 | Boughton | June 20, 1933 |
| 2,250,011 | Dayton | July 22, 1941 |
| 2,283,654 | Sinclair | May 19, 1942 |
| 2,344,690 | Freer | Mar. 21, 1944 |
| 2,346,480 | Freer | Apr. 11, 1944 |
| 2,351,952 | Goepfrich | June 20, 1944 |
| 2,371,554 | Scott-Iversen | Mar. 13, 1945 |
| 2,495,074 | Mossey | Jan. 17, 1950 |
| 2,575,963 | Kershner | Nov. 20, 1951 |
| 2,595,859 | Lambert et al. | May 6, 1952 |